United States Patent
Farkas et al.

(10) Patent No.: US 8,155,030 B2
(45) Date of Patent: *Apr. 10, 2012

(54) METHOD AND APPARATUS FOR NETWORK TREE MANAGEMENT

(75) Inventors: János Farkas, Kecskemét (HU); Csaba Antal, Kiskunlacháza (HU); Attila Takács, Budapest (HU); Panagiotis Saltsidis, Stockholm (SE)

(73) Assignee: Teleaktiebolaget L M Ericsson (Publ), Stockholm (SE)

( * ) Notice: Subject to any disclaimer, the term of this patent is extended or adjusted under 35 U.S.C. 154(b) by 231 days.

This patent is subject to a terminal disclaimer.

(21) Appl. No.: 12/523,781

(22) PCT Filed: Jan. 18, 2008

(86) PCT No.: PCT/IB2008/000119
§ 371 (c)(1),
(2), (4) Date: Jul. 20, 2009

(87) PCT Pub. No.: WO2008/087547
PCT Pub. Date: Jul. 24, 2008

(65) Prior Publication Data
US 2010/0054157 A1 Mar. 4, 2010

Related U.S. Application Data

(60) Provisional application No. 60/885,667, filed on Jan. 19, 2007.

(51) Int. Cl.
H04L 12/28 (2006.01)
H04L 12/56 (2006.01)
(52) U.S. Cl. ........................................ 370/256; 370/401

(58) Field of Classification Search .................. None
See application file for complete search history.

(56) References Cited

U.S. PATENT DOCUMENTS

| | | | |
|---|---|---|---|
| 6,578,086 B1 * | 6/2003 | Regan et al. | 709/242 |
| 6,614,764 B1 * | 9/2003 | Rodeheffer et al. | 370/254 |
| 7,428,237 B1 * | 9/2008 | Gai et al. | 370/395.53 |
| 7,480,258 B1 * | 1/2009 | Shuen et al. | 370/256 |
| 7,609,658 B2 * | 10/2009 | Niazi et al. | 370/256 |
| 7,649,884 B1 * | 1/2010 | Ahmed et al. | 370/390 |
| 2007/0064628 A1 * | 3/2007 | Tallet et al. | 370/256 |
| 2007/0159983 A1 * | 7/2007 | Eglin et al. | 370/254 |
| 2007/0206513 A1 * | 9/2007 | Cho et al. | 370/254 |
| 2008/0291823 A1 * | 11/2008 | Saltsidis | 370/216 |

OTHER PUBLICATIONS

Finn, Norman; "Shortest Path Bridging"; Sep. 22, 2005 pp. 1-95 XP002471513.
Finn, Norman, "Shortest Path Bridging"; Jan. 13, 2006; XP002485131.

* cited by examiner

*Primary Examiner* — Hong Cho

(57) ABSTRACT

There is disclosed a manner of managing the active topology, that is the scheme for forwarding data, in a computer network such as an Ethernet local area network. A root bridge is selected from a plurality of bridges in the network; the root bridge calculating at least one spanning tree from a topology database that has been populated by bridge neighbor information gleaned from link state advertising messages. The root bridge may also calculate an alternate topology for implementation in the event a failure condition that affects the primary spanning tree is detected. The root bridge then advertises the spanning tree and remotely configures the port states of the bridges in the spanning tree through tree advertising messages that the bridges are arranged to process and set their ports accordingly.

20 Claims, 8 Drawing Sheets

FIG. 5

```
                ┌────────────────────────────────────┐
                │       PROTOCOL IDENTIFIER          │
                ├────────────────────────────────────┤
        320 ─┐  │    PROTOCOL VERSION IDENTIFIER     │
             └─ ├────────────────────────────────────┤
                │           BPDU TYPE                │
                ├────────────────────────────────────┤
                │           CIST FLAGS               │
                ├────────────────────────────────────┤
                │        CIST ROOT IDENTIFIER        │
                ├────────────────────────────────────┤
                │      CIST EXTERNAL PATH COST       │
                ├────────────────────────────────────┤
                │    CIST REGIONAL ROOT IDENTIFIER   │
                ├────────────────────────────────────┤
                │        CIST PORT IDENTIFIER        │
                ├────────────────────────────────────┤
                │           MESSAGE AGE              │
                ├────────────────────────────────────┤
                │             MAX AGE                │
        325 ─┐  ├────────────────────────────────────┤
             └─ │           HELLO TIME               │
                ├────────────────────────────────────┤
                │          FORWARD DELAY             │
                ├────────────────────────────────────┤
                │      VERSION 1 LENGTH = 0          │
                ├────────────────────────────────────┤
                │         VERSION 3 LENGTH           │
        330 ─┐  ├────────────────────────────────────┤
             └─ │     MST CONFIGURATION IDENTIFIER   │
                ├────────────────────────────────────┤
                │     CIST INTERNAL ROOT PATH COST   │
                ├────────────────────────────────────┤
                │        CIST BRIDGE IDENTIFIER      │
                ├────────────────────────────────────┤
                │         CIST REMAINING HOPS        │
                ├────────────────────────────────────┤
                │     MSTI CONFIGURATION MESSAGES    │
                │          (MAYBE ABSENT)            │
                ├────────────────────────────────────┤
                │         VERSION 4 LENGTH           │
                │           (LSSTP BPDUS)            │
        335 ─┐  ├────────────────────────────────────┤
             └─ │         LSSTP PARAMETERS           │
                │           (LSSTP BPDUS)            │
                └────────────────────────────────────┘
```

| | |
|---|---|
| 340 → | VERSION 4 FLAGS |
| 345 → | LSSTP COMPUTATION PROTOCOL IDENTIFIER |
| 350A → | SEQUENCE NUMBER |
| 355 { | NUMBER OF OF LINKS (= NUMBER OF NEIGHBORS) |
| | LINK ID, LINK DATA-1 |
| | LINK ID, LINK DATA-2 |
| | ... |
| | LINK ID-N, LINK DATA-N |

FIG. 6B

| | |
|---|---|
| 340 → | VERSION 4 FLAGS |
| 345 → | LSSTP COMPUTATION PROTOCOL IDENTIFIER |
| 350B → | PATH VECTOR |
| 355 { | NUMBER OF OF LINKS (= NUMBER OF NEIGHBORS) |
| | LINK ID, LINK DATA-1 |
| | LINK ID, LINK DATA-2 |
| | ... |
| | LINK ID-N, LINK DATA-N |

| 340 | VERSION 4 FLAGS |
|---|---|
| 350 | LSSTP COMPUTATION PROTOCOL IDENTIFIER |
| | NUMBER OF LINKS (= NUMBER OF NEIGHBORS) |
| 355 | LINK ID, LINK DATA-1 |
| | LINK ID, LINK DATA-2 |
| | ... |
| | LINK ID-N, LINK DATA-N |

FIG. 6C

| 360 | VERSION 4 FLAGS |
|---|---|
| 365 | LSSTP COMPUTATION PROTOCOL IDENTIFIER |
| 370 | TREE ID |
| 375 | NUMBER OF BRIDGES |
| 380 | BRIDGE ID-1, ROOT PORT-1 DESIGNATED PORT LIST-1 |
| | BRIDGE ID-2, ROOT PORT-2 DESIGNATED PORT LIST-2 |
| | ... |
| | BRIDGE ID-N, ROOT PORT-N DESIGNATED PORT LIST-N |

FIG. 7

| 360 | VERSION 4 FLAGS |
|---|---|
| 365 | LSSTP COMPUTATION PROTOCOL IDENTIFIER |
| 370 | TREE ID |
| 385 | NUMBER OF LINKS (IN THE TREE) |
| 390 | BRIDGE ID-1, TO BRIDGE ID-2 |
| | BRIDGE ID-2, TO BRIDGE ID-4 |
| | ... |
| | BRIDGE ID-N, TO BRIDGE ID-N |

FIG. 8

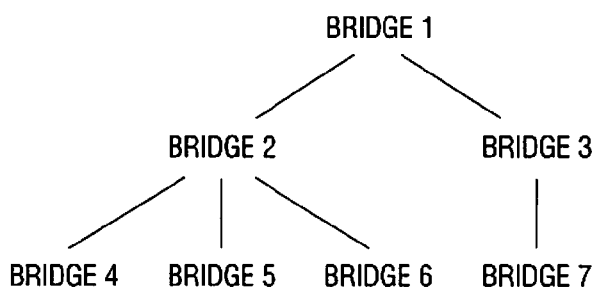

FIG. 9

METHOD AND APPARATUS FOR NETWORK TREE MANAGEMENT

RELATED APPLICATION AND CLAIM OF PRIORITY

This application is related to and claims benefit of the filing date of U.S. Provisional Patent Application No. 60/885,667 filed Jan. 19, 2007, which is entirely incorporated by reference herein.

TECHNICAL FIELD OF THE INVENTION

The present invention is directed, in general, to controlling data traffic in computer networks and, more specifically, to a method and system for tree management in Ethernets and similar networks using link state principles.

BACKGROUND OF THE INVENTION

Computers, broadly speaking, are electronic machines capable of storing and manipulating information, often called data, to useful ends. Frequently, a number of computers are connected together in such a way that they are able to send data to each other. A collection of computers so connected is often called a network, and the connector between two network nodes is referred to as a link. One type of computer network is called a LAN (local area network), and may be found, for example, in the offices of a small business or educational institution. A number of LANs or other networks may also be brought into communication with each other. As might be expected, a system of rules or set procedures must be put in place so that the computers and networks can communicate with each other effectively. Such a system of rules and procedures is often called a protocol, and several have been developed for communications involving computer networks.

A widely accepted set of protocols for LAN communications has been developed under the auspices of the IEEE (Institute of Electrical and Electronics Engineers). A standard generally referred to as IEEE 802, for example, covers general network architecture, IEEE 802.1 deals with bridging and management, and IEEE 802.3 is the Ethernet protocol. An Ethernet LAN is generally one that handles traffic, that is, the flow of data from one computer to one or more other, using a system of collision detection and avoidance. (A 'collision' occurs when two or more computers attempt to send data over the same link at the same time.) These standards are regularly reviewed and updated as necessary to improve networks operations and account for developments in technology.

In a typical Ethernet network, data sent from one computer to another, or from one network to another, is not transmitted all at once or continuously, but is instead broken up into discrete 'frames'. Using frames of data better allows the network computers to take turns sending data. The frames may vary in length, but each frame includes sufficient address information (in addition to the actual data) so it may be routed to its desired destination or destinations. Routing is necessary because every computer is not connected directly to every other. Instead, computers and networks are connected to intermediary devices that receive data, determine its destination address, and then route it accordingly. One such intermediary device is referred to as a bridge. A bridge is a type of software switch resident on a network component. A frame of data may be routed through many bridges on its way from source to destination.

FIG. 15 is a simplified schematic diagram illustrating the bridges of an exemplary network 10, in which embodiments of the present invention may be advantageously implemented. The network 10 may have many components, but for clarity only the bridges themselves are shown. Individual components such as computers and sub-networks may be connected to one of the bridges. In the embodiment of FIG. 15, there are nine bridges, numbered 1 through 9, although the present invention is also suitable for implementation in larger or smaller networks. Each of these bridges 1 through 9 is connected by a link to one or more other bridges. In FIG. 15 the links are numbered according to the bridges it connects, for example link 24 connects bridge 2 directly with bridge 4. A path includes all of the links from one bridge to another, for example one path from bridge 1 to bridge 9 includes links 13, 38, and 89. As should be apparent, there may be more than one path between any two bridges.

When a bridge receives a data frame from, for example, a network computer or another bridge, it examines the address information and forwards the frame accordingly. Data may have to pass through several bridges from its source to destination. Without some governing protocol, however, it is possible that frames of data might inadvertently be sent from bridge to bridge, eventually looping back to a previously-visited bridge from which they are re-sent back into the same loop. As should be apparent, this is not a desirable phenomenon and techniques have evolved for avoiding this looping problem.

One technique to avoid looping would be to use a fixed-configuration network and always route frames intended for a particular destination by the same route. Most networks are subject to change, however, and occasionally encounter break downs or congestion in components and links. A static routing system is therefore not the best solution. In a more successful solution, a 'spanning tree' is calculated periodically according to a spanning tree protocol (STP). The spanning tree provides path definitions for the network as it exists at the time of the tree calculation. In the event of a failure or other event, the tree can be recalculated to adjust to the new conditions.

Calculation of a spanning tree preferably involves not only designating a path from each source to each destination, but determining the best pathways for each case so that network communications are accomplished in an efficient manner. IEEE standards, for example, often use distance vector mechanisms to determine an active topology for the network, the active topology referring to the tree of data forwarding paths that will be used to route data traffic. This distance vector technique is well known and will not be discussed here in detail, except to note that the active topology is configured in a distributed manner, and so no bridge in the network is aware of the data distribution scheme in its entirety. It is therefore possible, or even likely, that the topology is not optimal. The distance vector approach is also less efficient at fault handling, that is at recovering from a failure occurring somewhere in the network.

A better solution may be to use a link state spanning tree calculation by applying the core functionality of IP (Internet protocol) using routing protocols such as OSPF (open shortest path first) and IS-IS (intermediate system to intermediate system). IP protocols are typically developed and disseminated by the IETF (Internet engineering task force). In general, the link state approach facilitates application of traffic engineering and allows the active topology to be optimized. Directly implementing IP routing protocols, however, would mean each bridge would have to set up its own forwarding tables. This is not a detriment in and of itself, but it may produce long unavailable periods resulting in at least transient loops. Another complication is that Ethernet frames do not include a TTL (time to live) field (as does an IP packet) so transient loops may be problematic when changes in active topology are occurring. Of course, bridges that notice the topology is changing could simply stop forwarding data frames until a new topology is calculated, but this procedure slows down the recovery significantly.

There is therefore a need in the art for a manner in which to implement a link state approach to spanning tree calculation that retains the advantages of link state protocols, but mitigates or eliminates the problems they have, especially those associated with an occasionally changing active topology. The present invention provides just such a solution.

SUMMARY OF THE INVENTION

To address the above-discussed deficiencies of the prior art, it is a primary object of the present invention to provide a method and arrangement for configuring the active topology of a computer network, for example an Ethernet LAN. It is a further object of the invention to apply an improved link state approach to network tree management, the improved link state approach having, among other things, an advantageous architecture and an improved recovery time as compared with conventional approaches.

In one aspect, the invention is a method for configuring a network, such as an Ethernet LAN, for efficient forwarding of data traffic, including collecting neighbor information, generating and distributing link state advertisements, populating a topology database for the network, and calculating in a root bridge the port states for each bridge in a tree using from the topology database. The method may further include advertising the tree by selectively distributing tree advertisement messages, receiving tree advertisement messages in bridges of the network, and configuring the ports of each bridge according to the advertisement message. The method may also further include the feature of recognizing, in a network bridge that a link state advertisement has already been processed, and to discard rather than forward them. In this way, a protocol for links states STP is defined that allows the application of flexible sets of routing objectives.

In another aspect, the present invention is a network comprising at least one root bridge, wherein the root bridge is remotely sets the port states of at least one other network bridge. In a preferred embodiment, the active network topology is calculated at the root bridge and imposed on all the other network bridges. A root bridge therefore is arranged to build a topology database and use the topology data base to calculate a spanning tree for the network. The root bridge is further arranged to generate and distribute tree advertisement messages that describe the tree for non-root bridges. Non-root bridges are arranged to receive the tree advertisement messages and process them. The non-root bridges are also arranged to configure their ports according to the description in the tree advertisement message, and to selectively forward the tree advertisement messages in the direction of leaf bridges. Non-root bridges may also be arranged to modify the tree description in the tree advertisement message prior to forwarding them to other bridges. In this manner, problems due to any potential inconsistency in link state databases may be mitigated or eliminated entirely, as the time needed to synchronize databases following a failure is eliminated. In some embodiments, the use of alternate or backup ports is implemented when a failure condition is detected.

In yet another aspect, the present invention is a bridge for use in a network, the bridge arranged to serve as a root bridge by calculating a spanning tree based on collected network information, to configure itself according to the calculated tree, and to remotely configure the other bridges in the spanning tree.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such-defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 5 depicts a LSSTP_BPDU (link state spanning tree protocol bridge protocol data unit) according to an embodiment of the present invention.

FIGS. 6a through 6c illustrate LSSTP parameters for an LSA_BDPU according to embodiments of the present invention.

FIG. 7 illustrates LSSTP parameters for a TA_BDPU (tree advertisement BDPU) according to an embodiment of the present invention.

FIG. 8 illustrates simplified LSSTP parameters for a TA_BDPU according to another embodiment of the present invention.

FIG. 9 illustrates an exemplary spanning tree topology for which embodiments of the present invention may be advantageously implemented

DETAILED DESCRIPTION OF THE INVENTION

FIGS. 1 through 16, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged computer network.

Figure 16:
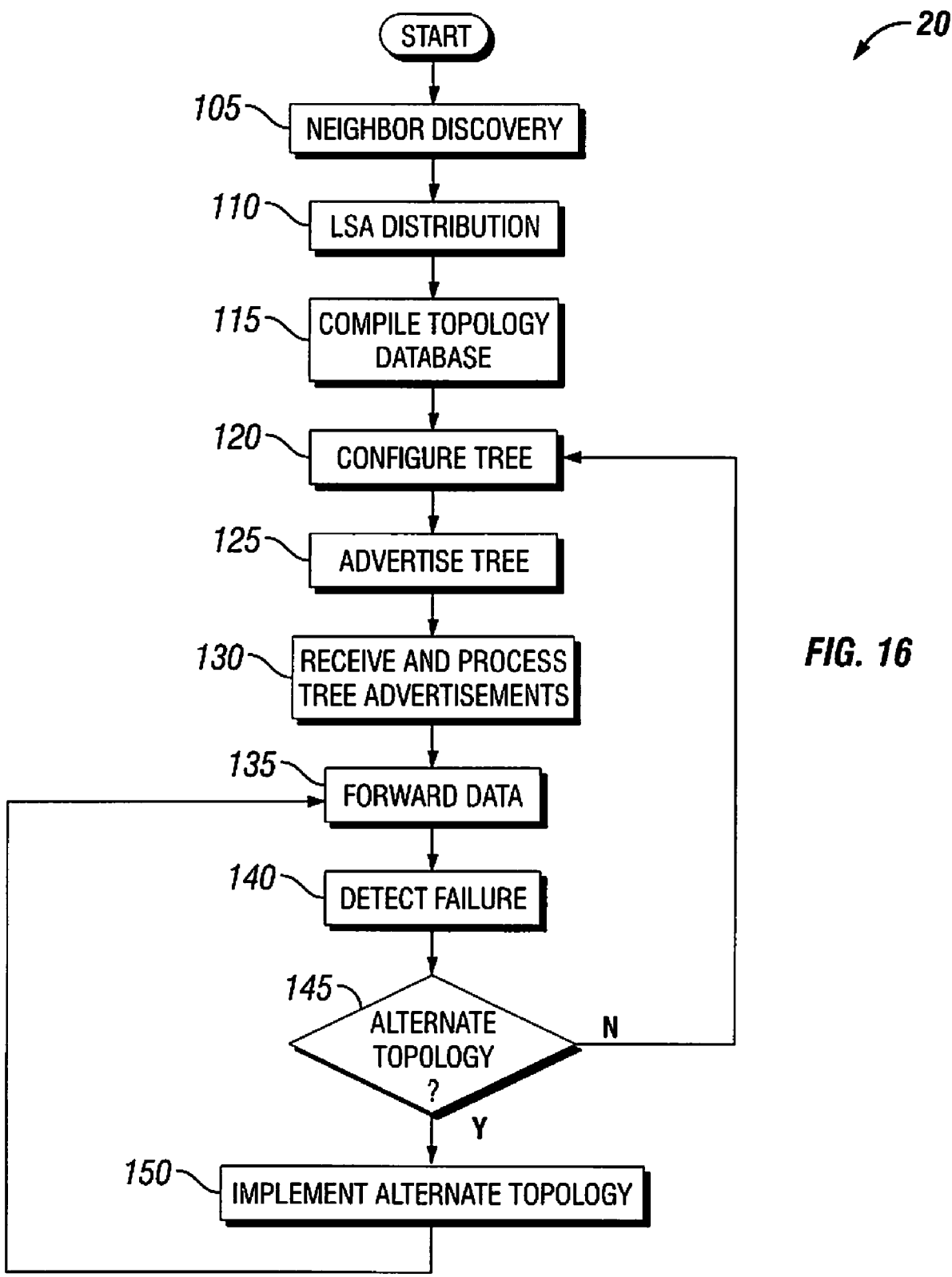
FIG. 16 is a flow diagram illustrating a method of facilitating data traffic flow according to an embodiment of the present invention.

The present invention is directed to a new approach to facilitating the management of data traffic flow in a network, such as an Ethernet LAN (local area network), using a spanning tree active topology. FIG. 16 is a flow diagram illustrating a method 20 of facilitating data traffic flow according to an embodiment of the present invention. At START it is assumed that a network operable to communicate data via a plurality of bridges has been formed, such as the one shown in FIG. 15. The network is, for example, an Ethernet LAN network operable according to the IEEE 802 family of protocols, but other similarly arranged networks may be used as well. The process begins when the network is assembled and energized for operation, or at some later time as determined by a network operator. In this embodiment, it is also presumed that a root bridge for the network has been determined. This may be done in a number of ways, although no particular way is required by the present invention unless specifically recited in a given embodiment. Returning to the method 20 of FIG. 16, in step 105 neighbor discovery is undertaken, so that each of the network bridges may learn the other bridges to which they are connected. The information discovered in the neighbor discovery step 105 is then transmitted (step 110) to other bridges via LSAs (link state advertisements). Although the LSAs flood the network, in a preferred embodiment they will be discarded (step not shown) by bridges that, for example, realize they have already learned the information contained in a particular LSA.

The root bridge then compiles a topology database (step 115), and uses the topology database to develop a spanning tree for the network and calculating the necessary port configurations (step 120) for each (non-root) bridge. The port configurations for each bridge, of course, implement the calculated spanning tree in the network. In accordance with the present invention, the root bridge makes these determinations for each of the non-root bridges. The root bridge then advertises the spanning tree (step 125) by sending TAs (tree advertisements) out to the network components. Each bridge then processes the TA messages and sets its ports (step 130) according to the instructions contained in the TA. The spanning tree has at this point been configured according to an embodiment of the present invention and the routing of data traffic (step 135) may either begin, or continue, as the case may be.

One advantage of the present invention, however, is the manner in which a network configured in this manner responds to a failure, that is, the inability to route traffic according to the current active topology. To illustrate this, the method 20 of FIG. 16 continues with the step 140, where a failure condition is detected. Failure, or failure condition, as used herein, refer to an event that prevents or significantly inhibits forwarding data according to a current active topology. That is, failure may include an actual breakdown, but may also include the addition or removal of network bridges, links or other components, or significant bottlenecks. In this embodiment, it is first determined (step 145) whether an alternate (or backup) topology has been established. If so, the alternate topology is implemented (step 150). If not, or if the alternate topology is not successful, the process in this embodiment returns to step 120 and a new tree is calculated. This assumes, of course that the root bridge topology database has been maintained through periodic neighbor discovery messages, and the link state information is up to date. In other embodiments, the process may instead return to the neighbor discovery step 105 or the LSA step 110 prior to generating or updating the topology database and calculating a new spanning tree at step 120. In any case, however, since the root bridge remotely sets the port states of the non-root bridges, there is no need to wait until all bridge databases have been synchronized, and typically resulting in a faster recovery time. Finally, note that the calculation of a backup or alternate topology is optional, but in many cases can help speed recovery after failure. The alternate topology may be calculated when the primary active topology is determined, or at a later time and advertised separately.

The variation operations associated with embodiments of the present invention will now be described in greater detail. For this purpose, it will be presumed that various of the message described above, such as LSAs and TAs, are in the format of standard BPDUs (bridge protocol data units) that have been modified according to the present invention for their respective purpose. The use of modified BPDUs in this way is preferred but not required.

Figure 1:
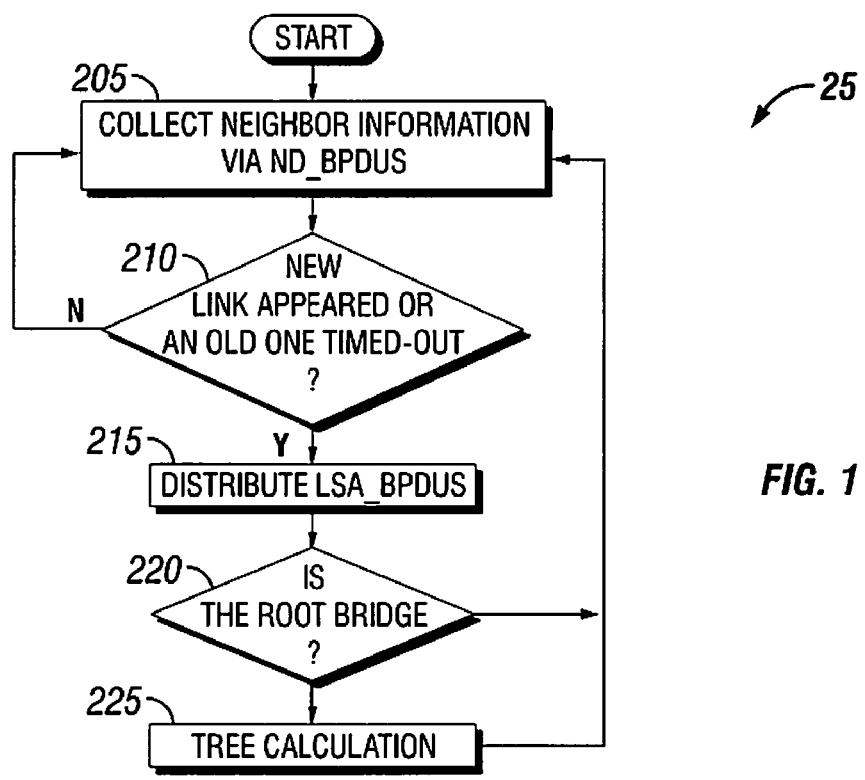
FIG. 1 is a flow diagram illustrating a method of performing neighbor discovery according to an embodiment of the present invention.

FIG. 1 is a flow diagram illustrating a method 25 of performing neighbor discovery according to an embodiment of the present invention. Again, at START, the network is presumed to be physically assembled and operable according to the method of the present invention. In this embodiment, neighbor information is collected via neighbor discovery messages, and preferably ND_BPDUs (step 205). Other types of messages may be used for collection of neighbor information may be used in other embodiments. In this embodiment, ND_BPDUs are sent and received according to a predetermined time period (the "Hello Time Period"). The received ND_BPDUs are examined and the information stored in a topology database (step not shown) for later reference.

As ND_BPDUs are received each Hello Time Period, many times they will contain information already stored in the topology database. At other times, a new neighbor may manifest itself, or an expected ND_BPDU is not received, signaling a change in the configuration of the network. Therefore, each Hello Time Period each bridge examines the ND_BPDUs received and determines (step 210) if a new link has appeared or an existing one has timed out. That is, entries in the topology database may be timed out and erased after a predetermined number of Hello Time Periods if no ND_BPDU confirming their validity has been received. If no change occurs, the process simply returns to step 205 and collecting neighbor information as it is disseminated each Hello Time Period. If a change has been perceived, the bridge distributes LSA_BPDUs (step 215) to advertise the change. The topology database may also be updated at this time (step not shown). Each bridge then determines if it is currently a root bridge (step 220) and, if so, performs a tree calculation (step 225) with the newly acquired network information. Note that in accordance with the present invention, only root bridges need to perform the tree calculation process. In accordance with the present invention, the root bridge may run any active topology algorithm to build up the tree.

Figure 2:
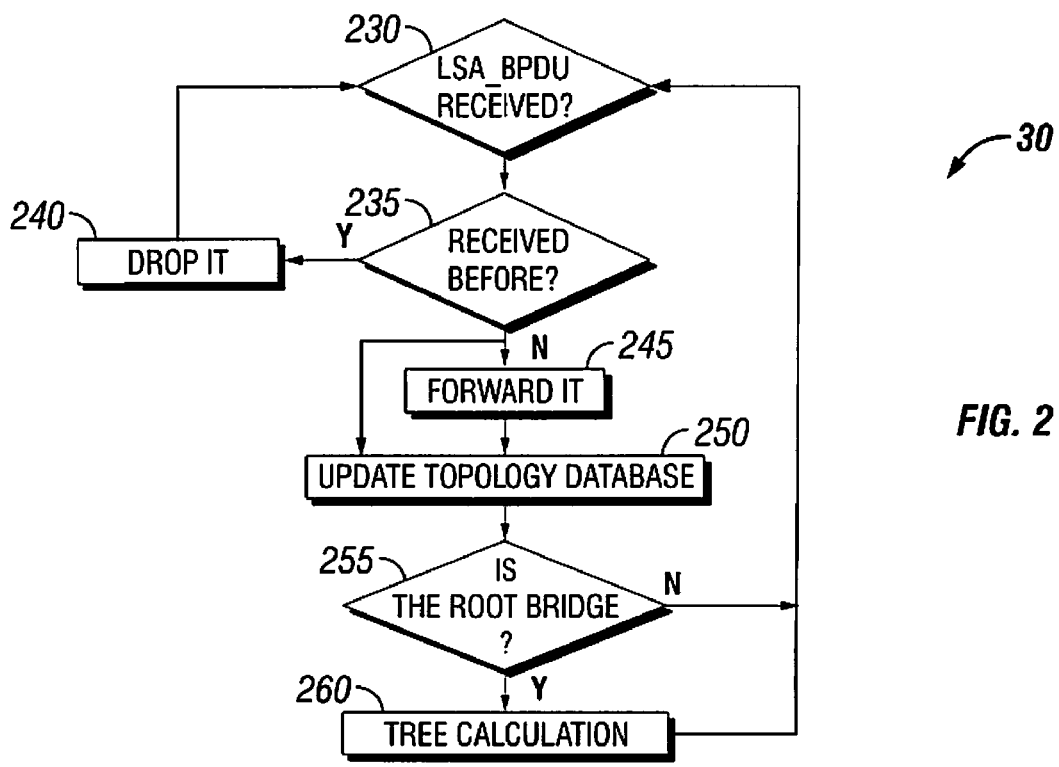
FIG. 2 is a flow diagram illustrating a method of processing a link state advertisement (LSA) according to an embodiment of the present invention.

The LSA_BPDUs distributed in step 215 are subsequently received in the various network bridges. FIG. 2 is a flow diagram illustrating a method 30 of processing a link state advertisement (LSA) according to an embodiment of the present invention. When an LSD_BDPU is received (step 230) at a bridge it is first examined (step 235) to determine whether it is outdated or has been received previously. This may be done using one or more techniques. For example, the receiving bridge may examine a sequence number and sending-bridge identifier of the LSA_BPDU. If a newer LSA_BPDU has already been received from that bridge, the one being examined may be discarded. In another embodiment, a path vector mechanism is employed and the receiving bridge checks to see if its own bit is set to determine whether the LSA_BDPU has been seen before. In yet another embodiment, a time-to-live field (TTL) may be utilized, with LSA_BPDUs being examined for age. If one or more of these methods indicates that the LSA_BPDU is no longer useful, it is discarded (step 240). This helps to prevent LSA_BPDUs from continuing to circulate unnecessarily in the network when they are no longer useful (although, depending on the determining technique used, they may under certain conditions be processed more than once in the same bridge).

If the LSA_BDPU has not been received before, then it is forwarded (step 245) on each port of the bridge, except for the one on which it was received, and the bridge's topology database is updated (step 250). As in FIG. 1, each bridge, having updated its topology database, then determines if it is currently a root bridge (step 255) and, if so, performs a tree calculation (step 260) with the newly acquired network information. Note again that in accordance with the present invention, only root bridges need to perform the tree calculation process.

Figure 3:
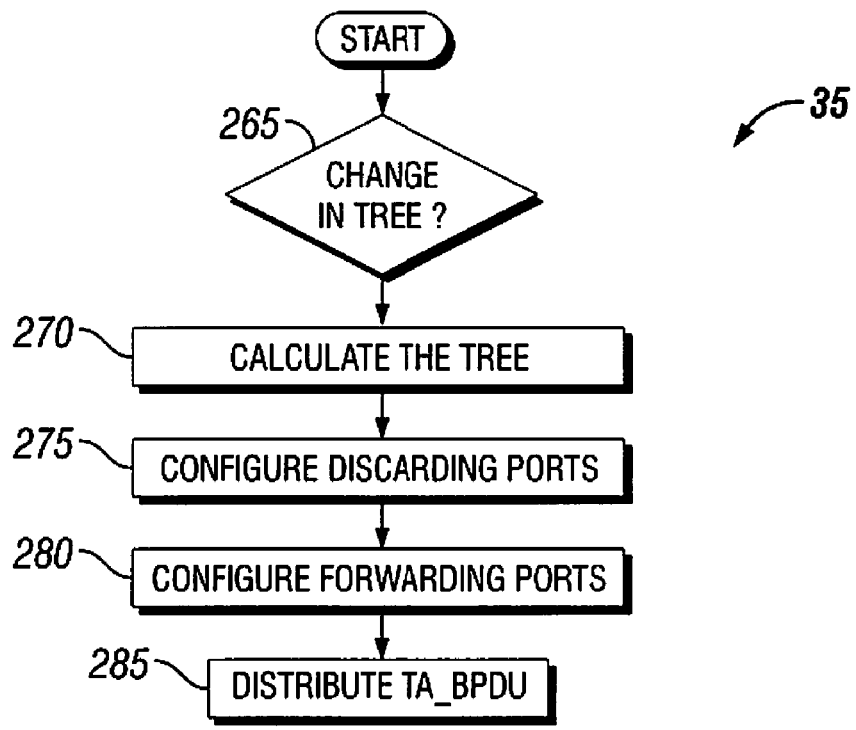
FIG. 3 is a flow diagram illustrating a method of calculating a spanning tree according to an embodiment of the present invention.

The tree calculation process undertaken by the root bridge according to one embodiment of the present invention is shown in FIG. 3. FIG. 3 is a flow diagram illustrating a method 35 of calculating a spanning tree according to an embodiment of the present invention. The method 35 of FIG. 3 begins with determining whether a change in the tree is necessary (step 265). This determination may be performed at regular intervals, or upon the happening of a triggering event, or both. If a tree change is not necessary, of course, the ordinary operation of the network may simply continue. If a tree change is determined to be necessary, then the method 35 proceeds to calculate a new tree from the current topology database (step 270). (Note that method 35 describes a root bridge operation, so no step of determining root-bridge status is shown.) The root bridge then configures discarding ports (step 275), followed by a configuration of forwarding ports (step 280). The tree configuration is then distributed throughout the network (step 285), for example using TA_BPDU messages.

Figure 4:
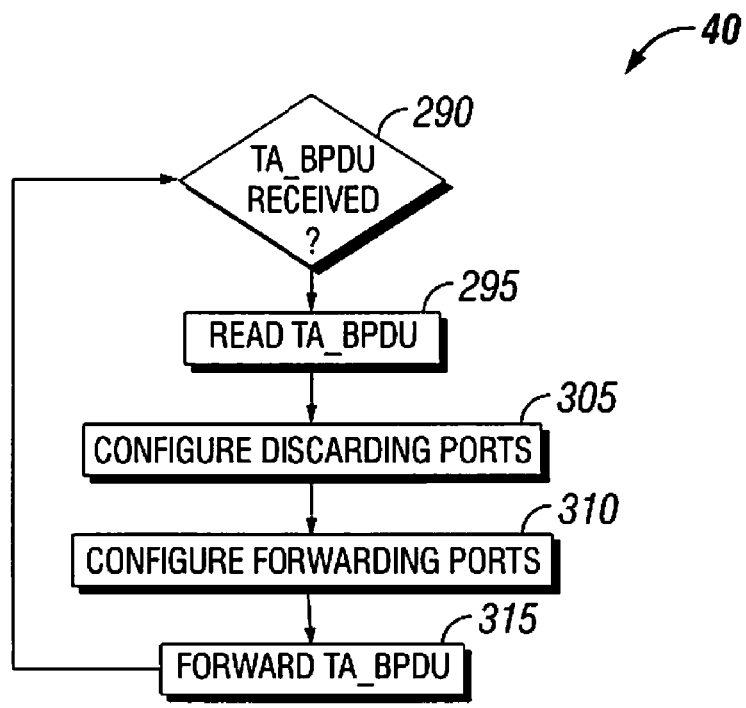
FIG. 4 is a flow diagram illustrating a method of tree configuration according to an embodiment of the present invention.

When the TA_BPDU (or other tree advertisement message) is received at a non-root bridge, it is processed and forwarded as necessary. FIG. 4 is a flow diagram illustrating a method 40 of tree configuration in a non-root bridge according to an embodiment of the present invention. The process begins with determining whether a TA_BPDU has been received (step 290). If not, of course, the routing of data traffic, if any, may continue normally. If so, the TA_BPDU is read (step 295), and the discarding ports, of any, are configured (step 305). The discarding ports do not have to be configured first, but his order is preferred and helpful to creating a loop-free topology. The forwarding ports, if any, are then configured (step 310). Assuming at least one forwarding port has been configured, the TA_BPDU is then forwarded on each of the bridge's forwarding ports (step 315).

The format of BPDU messages follows generally the MSTP BPDU format of IEEE 802, with certain differences and special considerations as set forth below and in FIG. 5 though 12. FIG. 5 depicts a LSSTP_BPDU (link state spanning tree protocol BPDU) 45, according to an embodiment of the present invention. Regarding the fields of the LSSTP_BPDU especially related to implementation of the present invention, the BPDU type field 320 will reflect that this is an LSSTP_BPDU message. The Hello Time field 325 is used only in ND_BPDUs, not in other types of LSSTP_BPDUs. Note that the tree configuration identifier field 330 is the same as is proposed in IEEE 802.1ap Virtual Bridged Local Area Networks—Amendment 9: Shortest Path Bridging, Draft D0.3, dated May 9, 2006. The LSSTP Parameters 335 vary according to the type of LSSTP_BPDU, as described in more detail below.

For an ND_BPDU according to the present invention, the LSSTP Parameters 335 are empty, as the necessary corresponding-link bridge and port identifiers are currently specified in the proposed IEEE 802 MSTP BPDU. In other words, the neighbor discovery process does not require additional LSSTP parameters for successful operation.

For LSA_BPDUs according to the present invention, there are several options available. These options correspond generally with the different embodiments, described above in the context of discarding LSAs when they are outdated or no longer useful. These options are illustrated in FIGS. 6a through 6c, which show LSSTP parameters for an LSA_BDPU according to three embodiments of the present invention. In each of these embodiments, the respective LSSTP parameters include a Flags field 340 and a LSSTP Computation Protocol Identifier field 345, followed by link description information 355. In FIG. 6a, an optional LSA-removal field 350a includes a Sequence Number along with the Bridge ID of the sending bridge. In FIG. 6b, optional LSA-removal field 350b includes a Path Vector. The LSA removal options associated with each of these LSA-removal fields has been described above (in reference to FIG. 2). In a third embodiment, the TTL information already part of the standard BPDU message is used instead—and therefore no LSA-removal field is necessary—as shown in FIG. 6c. Note that more than one of these LSA-removal options may be used, with appropriate changes made to the LSSTP parameters if needed, but using more than one option is not presently preferred. In an alternate embodiment, no LSA removal option is used at all, but this is not recommended.

FIG. 7 illustrates LSSTP parameters for a TA_BDPU (tree advertisement BPDU) according to an embodiment of the present invention. This type of message also includes a Flags field 360 and a LSSTP Computation Protocol Identifier field 365. A Tree ID field 370 follows, and a Number of Bridges field 375, which of course specifies the number of bridges in the tree. The individual Bridge fields 380 follow, one for each bridge in the identified tree. The individual Bridge fields each identify the port configuration for one of the bridges in the tree. In this embodiment, the designated forwarding ports for each bridge are specified, and the remaining ports at that bridge are assumed to be discarding ports and configured accordingly. As mentioned above, these discarding ports are preferably configured first, prior to setting the forwarding ports. The root port is also specified, in this embodiment immediately following each Bridge ID. An alternate port toward the root bridge may also be listed (but is not shown in FIG. 7).

FIG. 8 illustrates simplified LSSTP parameters for a TA_BDPU according to another embodiment of the present invention. Here, following the Tree ID field 370, a Number of Links field 385 relates the number of links in the tree rather than the number of bridges. Links fields 390 therefore follow the Number of Links field 385, and describe the tree in terms of the links between bridges. This reduces the size of the TA_BPDU, but increases the processing complexity as each bridge has to determine the how to set their ports based on the received tree description. Whether this trade-off is desirable may vary from network to network.

An even more abbreviated form may be useful in some applications. The exemplary tree topology of FIG. 9, for example may be advertised using the TA_BPDU sequences illustrated in FIGS. 10-12. As can be seen in FIG. 9, Bridge 1 has two designated ports and hence two branches leading from it, specifically to Bridges 2 and 3. Bridge 2, in turn, has three branches leading out to Bridges 4, 5, and 6, and Bridge 3 had one branch leading to Bridge 7. Bridges 4 through 7 are leaf bridges, and therefore have no branches leading from them.

Figure 10:
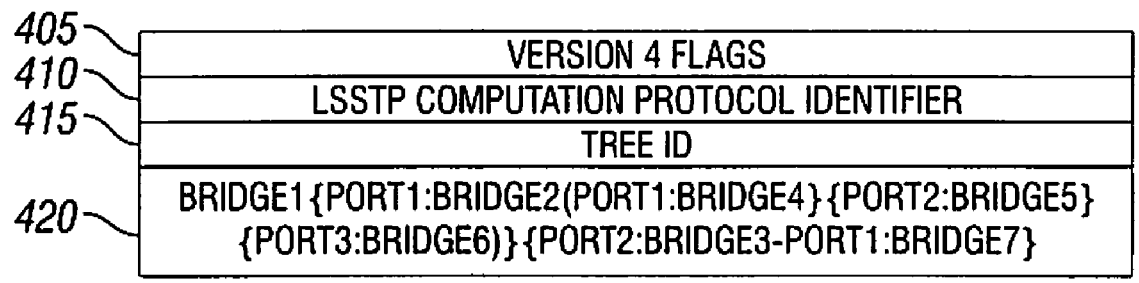
FIG. 10 illustrates a tree description for the Bridge 1 shown in FIG. 9 according to an embodiment of the present invention.

According to this embodiment, a first TA_BPDU message is received in Bridge 1; this message (or rather the relevant portion thereof) is illustrated in FIG. 10. This type of message also includes a Flags field 405 and a LSSTP Computation Protocol Identifier field 410. A Tree ID field 415 follows. After the Tree ID field 415 is a first Tree Description field 420. The first Tree Description field includes the information needed at Bridge 1, namely, the relationship of the links and bridges that follow. As represented in FIG. 10, a first set of brackets encloses the identities of all of the links and bridges associated with port 1 of Bridge 1, and a second set of brackets encloses the identities of all the links and bridges associated with port 2 of bridge 1. Regarding the latter, port 2 is designated to a link to Bridge 3, and port 1 of Bridge 3 is designated to link to bridge 7. Port 1 of bridge 1 is also designated to link to a single bridge, Bridge 2, but since Bridge 2 has three ports, each designated to link to a respective one of Bridges 4, 5, and 6, the designations of Bridge 2's ports are each isolated in a set of interior brackets in the Tree Description field 420 of FIG. 10.

Figure 11:
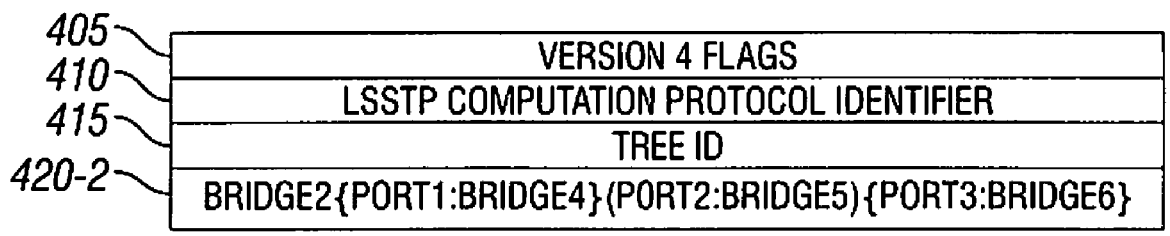
FIG. 11 illustrates a tree description for the Bridge 2 shown in FIG. 9 according to an embodiment of the present invention.
Figure 12:
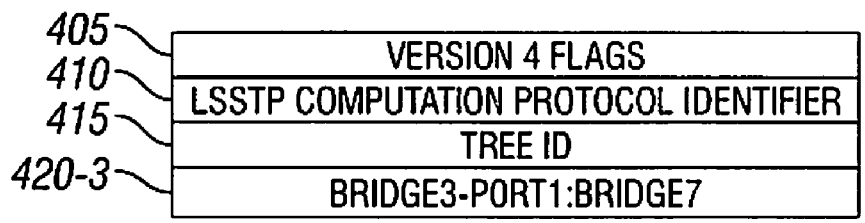
FIG. 12 illustrates a tree description for the Bridge 3 shown in FIG. 9 according to an embodiment of the present invention.

Naturally, Bridge 1 uses the information in the Tree Description field 420 to configure its own ports 1 and 2. It then transmits one modified version of TA_BPDU message to Bridge 2 and another to Bridge 3 using the appropriate ports. In each case, the port designations not applicable to the recipient bridge are removed by Bridge 1 prior to sending. The TA_BPDU sent to Bridge 2 is illustrated in FIG. 11. In FIG. 11, it can be seen that in the Tree Description field 420-2, all that remains are the port assignments for Bridge 2; port 1, for example is designated to link to Bridge 4. Similarly, FIG. 12 illustrates the TA_BPDU, which is transmitted from Bridge 1 to Bridge 3. In FIG. 12, it can be seen that in the Tree Description field 420-3, all that remains is the port assignment for port 1 of Bridge 3, which is designated to link to Bridge 7. For example is designated to link to Bridge 4. Note that Bridges 4 through 7 are leaf bridges and as such have no forwarding ports to set. The TA_BPDUs (not shown) sent to these leaf bridges are similar to those depicted in FIGS. 10 through 12, but they will have a NULL value for their Tree Description field.

Figure 13:
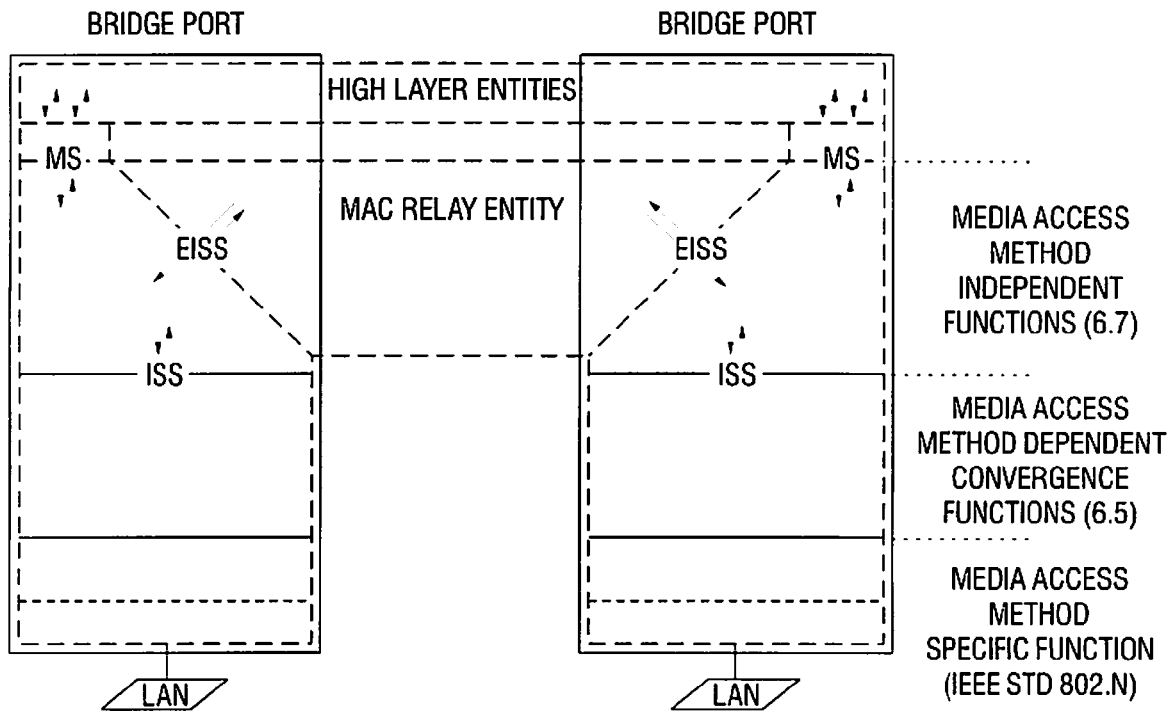
FIG. 13 illustrates a bridge architecture according to an embodiment of the present invention.
Figure 14:
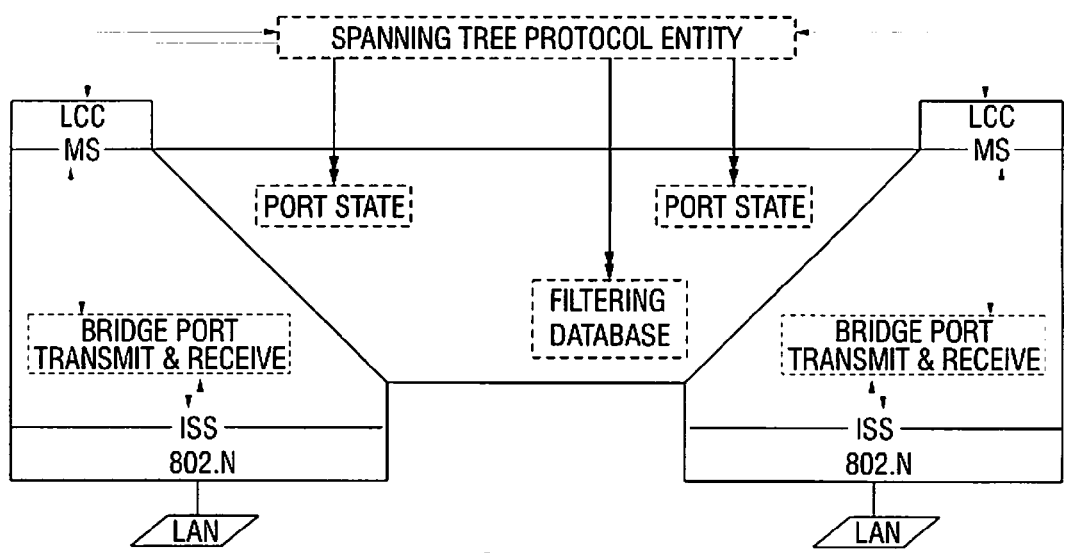
FIG. 14 illustrates an operation of a spanning tree protocol in routing protocol according to an embodiment of the present invention.
Figure 15:
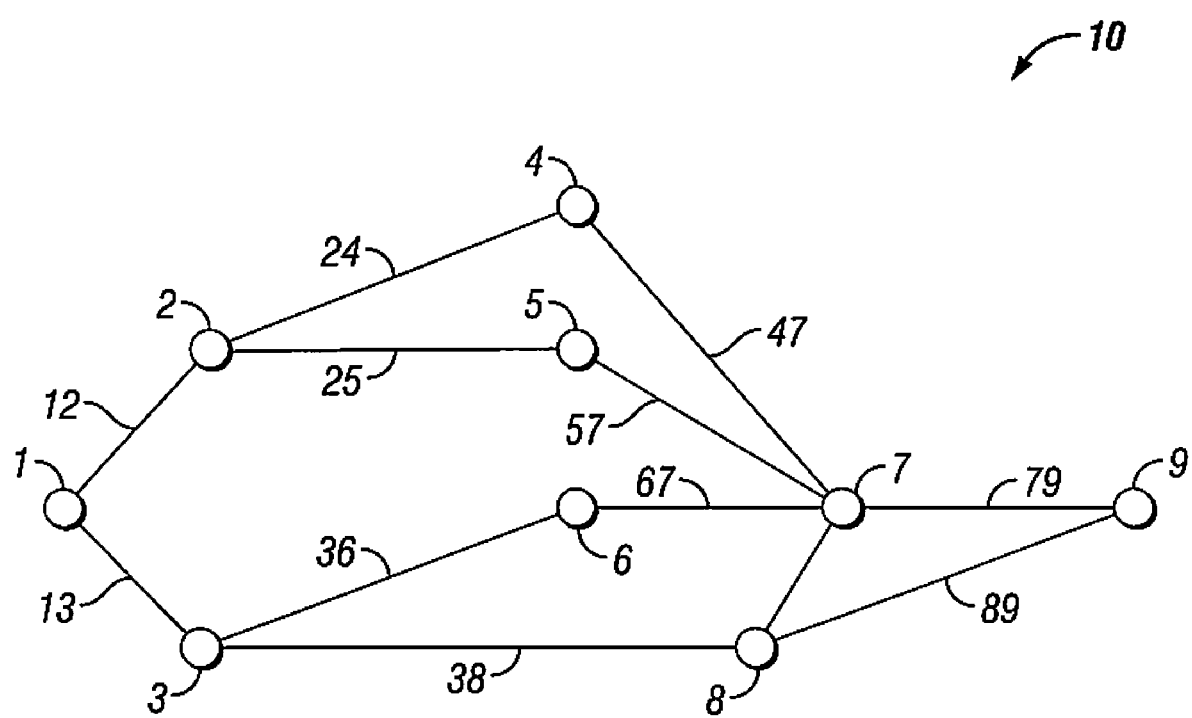
FIG. 15 is a simplified schematic diagram illustrating the bridges of an exemplary network, in which embodiments of the present invention may be advantageously implemented.

FIG. 13 illustrates a bridge architecture according to an embodiment of the present invention. Note that IP link state routing protocols such as OSPF or IS-IS are not suitable without modification for application to forwarding control in Ethernet networks because loop prevention is not assured. In accordance with the present invention, however, the routing protocol entity is implemented as a higher layer as shown in FIG. 13. Operation of the STP (spanning tree protocol) entity as a higher layer entity is illustrated in FIG. 14. The routing protocol entity is attached to each port of a bridge similarly to the SPT entity. In this way, the routing protocol entity is able to send and receive frames on each port. For a routing protocol messages that is to flood the network, the routing protocol entity sends out the message on each port except the port on which the message was received. Other messages are processed by the routing protocol entity and only sent out on designated ports.

As mentioned above, the routing protocols are not applicable without some modification. First, IP addresses are replaced by MAC addresses in the routing protocol and each frame is them forwarded according to the MAC address in its header. Second, a tree advertisement is inserted into routing protocol messages and the processing of tree advertisements is implemented in network bridges, as described in more detail above. Note that tree advertisements may be carried in routing protocol objects that are prepared for routing-protocol extensions. For OSPF routing, for example, a new type of Opaque LSA may be required. Opaque LSAs in OSPF provide for generalized for protocol extensions, and tree advertisement may be considered a type of extension. In a preferred embodiment, type-9 (link local) is used for tree advertisement Opaque LSAs. Tree advertisement may also be implemented in an IS-IS routing protocol using similar protocol extensions applicable there.

In accordance with the present invention, tree advertisement messages (TA_BPDUs, for example) should not be flooded, to avoid accidental loops. Rather, they are forwarded only on links that are part of the tree that they advertise, and are sent from the root bridge toward the leaves. The tree topology is calculated in the root bridge, and all other bridges configure their ports according to the received tree advertisement.

Note that processing of the tree advertisement messages accordance with the present invention may represent a new functionality implemented in the bridges' routing protocol entity. This new functionality includes the proper configuration of the ports that are part of the tree. That is, the bridges send the tree advertisement only to selected neighbor bridges instead of flooding all ports. The bridge may in some embodiments (as mentioned above) have to adjust the tree advertisement before forwarded it on the designated ports. The tree description schemes described above may also be implemented in routing protocols with the proper functionality.

In this manner, IP routing protocols may be applied for the control of forwarding, that is, configuration of the active topology, in Ethernet networks.

Although the present invention has been described in detail, those skilled in the art should understand that they can make various changes, substitutions and alterations herein without departing from the spirit and scope of the invention in its broadest form.

What is claimed is:

1. A method for setting up and updating a tree in a computer network having a plurality of network nodes controlled in a link state manner where in said plurality of network nodes are interconnected using a plurality of bridges wherein each node includes one or more ports for connecting a bridge with a neighboring node, wherein a topology database is available at each network node, said method comprising the steps of:
   calculating a topology of a tree using only a root bridge of the tree;
   configuring, by the root bridge, one or more of its ports participating in the tree;
   advertising, by the root bridge, the topology of the tree by sending a tree topology advertisement to the neighboring network nodes participating in the tree;
   configuring, by the neighboring network nodes, the one or more ports for each of the network nodes participating in the tree according to the tree topology advertisement; and
   forwarding the tree topology advertisement through the configured ports of the neighboring network nodes along the tree.

2. The method of claim 1, wherein the step of calculating the topology of the tree is based on a topology database populated with neighbor information obtained from link state advertisement messages, the topology database being maintained by a link state protocol.

3. The method of claim 1, wherein the step of advertising the topology of the tree comprises sending a message containing all port configurations of all bridges.

4. The method of claim 1, wherein the tree topology advertisement comprises sending a message containing a description of all links taking part in the tree.

5. The method of claim 1, wherein the tree topology advertisement provides an identification of nodes in the tree and port configuration of each node in the tree.

6. The method of claim 1, wherein bridges not calculating the tree, configure the tree received in the tree topology advertisement to avoid transient loops.

7. The method of claim 6, wherein the bridges not calculating the tree only configure active links taking part in the tree received in the tree topology advertisement after configuring blocked links.

8. The method of claim 1, wherein the nodes not calculating the tree forward the tree topology advertisement after configuring the tree.

9. The method of claim 1, wherein nodes not calculating the tree forward a modified tree topology advertisement containing only the relevant subtree of the tree.

10. The method of claim 1, further comprises the steps of:
    recalculating the topology of the tree using the root bridge if the topology database changes;
    advertising the new tree topology using the root bridge;
    updating the tree by the non-calculating bridges based on the advertisement of the new tree topology; and
    distributing the topology advertisement along the new tree.

11. A system for setting up and updating a tree in a computer network having a plurality of network nodes controlled in a link state manner where in said plurality of network nodes are interconnected using a plurality of bridges wherein each node includes one or more ports for connecting a bridge with a neighboring node, wherein a topology database is available at each network node, comprising:
    means for calculating a topology of a tree using only a root bridge of the tree;
    means for configuring, by the root bridge, one or more of its ports participating in the tree;
    means for advertising. by the root bridge, the topology of the tree by sending a tree topology advertisement to the neighboring network nodes participating in the tree;
    means for configuring, by the neighboring network nodes, the one or more ports for each of the network nodes participating in the tree according to the tree topology advertisement; and
    means for forwarding the tree topology advertisement through the configured ports of the neighboring network nodes along the tree.

12. The system of claim 11, wherein the means for calculating the tree topology is based on a topology database populated with neighbor information obtained from link state advertisement messages, the topology database being maintained by a link state protocol.

13. The system of claim 11, wherein the means for advertising the tree topology comprises means for sending a message containing all port configurations of all bridges.

14. The system of claim 11, wherein the means for advertising comprises means for sending a message containing a description of all links taking part in the tree.

15. The system of claim 11, wherein the means for advertising provides an identification of nodes in the tree and port configuration of each node in the tree.

16. The system of claim 11, wherein bridges not calculating the topology of the tree, configures the tree received in the tree topology advertisement to avoid transient loops.

17. The system of claim 11, wherein the bridges not calculating the topology of the tree only configures active links taking part in the tree received in the tree topology advertisement after configuring blocked links.

18. The system of claim 11, wherein the nodes not calculating the topology of the tree forward the tree topology advertisement after configuring the tree.

19. The system of claim 11, wherein nodes not calculating the topology of the tree forward a modified tree topology advertisement containing only the relevant subtree of the tree.

20. The system of claim 11, further comprises:
    means for recalculating the topology of the tree using the root bridge if the topology database changes;
    means for advertising the new tree topology using the root bridge;
    means for updating the tree by the non-calculating bridges based on the advertisement of the new tree topology; and
    means for distributing the topology advertisement along the new tree.

* * * * *

UNITED STATES PATENT AND TRADEMARK OFFICE
CERTIFICATE OF CORRECTION

PATENT NO. : 8,155,030 B2
APPLICATION NO. : 12/523781
DATED : April 10, 2012
INVENTOR(S) : Farkas et al.

It is certified that error appears in the above-identified patent and that said Letters Patent is hereby corrected as shown below:

On the Face Page, in Field (73), under "Assignee", in Column 1, Line 1, delete "Teleaktiebolaget" and insert -- Telefonaktiebolaget --, therefor.

In Column 5, Line 2, delete "LSA_BDPU" and insert -- LSA_BPDU --, therefor.

In Column 5, Line 4, delete "TA_BDPU" and insert -- TA_BPDU --, therefor.

In Column 5, Line 5, delete "BDPU)" and insert -- BPDU) --, therefor.

In Column 5, Line 8, delete "TA_BDPU" and insert -- TA_BPDU --, therefor.

In Column 5, Line 12, delete "implemented" and insert -- implemented. --, therefor.

In Column 7, Line 33, delete "LSD_BDPU" and insert -- LSD_BPDU --, therefor.

In Column 7, Line 43, delete "LSA_BDPU" and insert -- LSA_BPDU --, therefor.

In Column 7, Line 52, delete "LSA_BDPU" and insert -- LSA_BPDU --, therefor.

In Column 8, Line 32, delete "though" and insert -- through --, therefor.

In Column 8, Lines 56-57, delete "LSA_BDPU" and insert -- LSA_BPDU --, therefor.

In Column 9, Line 8, delete "TA_BDPU" and insert -- TA_BPDU --, therefor.

In Column 9, Line 28, delete "TA_BDPU" and insert -- TA_BPDU --, therefor.

In Column 11, Line 19, in Claim 1, delete "where in" and insert -- wherein --, therefor.

In Column 12, Line 9, in Claim 11, delete "where in" and insert -- wherein --, therefor.

In Column 12, Line 18, in Claim 11, delete "advertising." and insert -- advertising, --, therefor.

Signed and Sealed this
Twenty-fourth Day of July, 2012

David J. Kappos
*Director of the United States Patent and Trademark Office*